Aug. 25, 1942.    A. H. THOMPSON    2,294,058
METHOD OF MAKING LOCK-NUTS
Filed Oct. 29, 1941
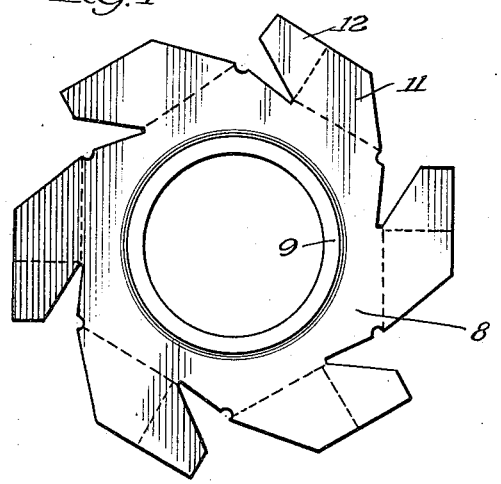
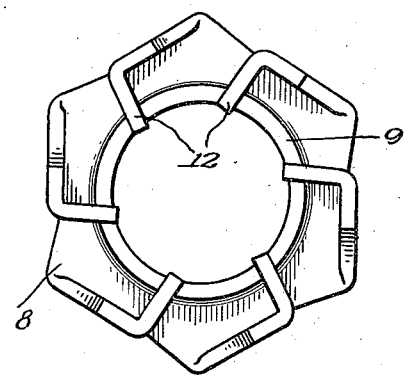
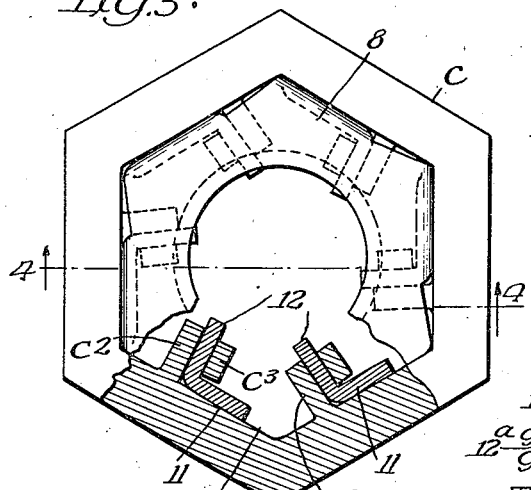
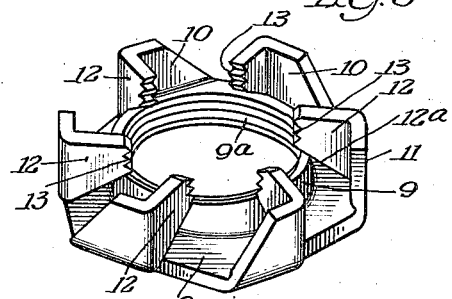
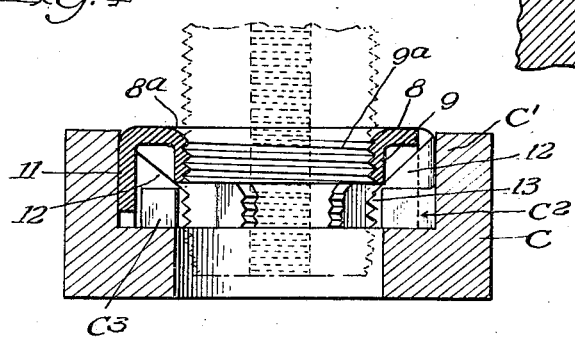
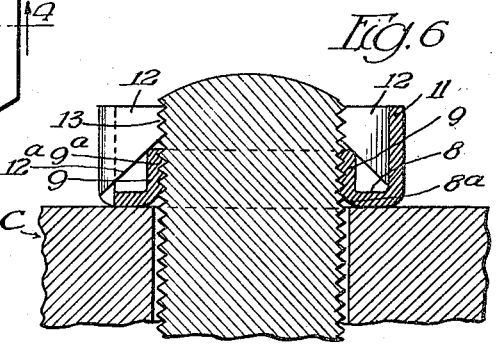
Inventor
Arthur H Thompson
By Fred Gerlach
his Atty Patented Aug. 25, 1942

2,294,058

UNITED STATES PATENT OFFICE 2,294,058

METHOD OF MAKING LOCK NUTS

Arthur H. Thompson, Chicago, Ill., assignor to Thompson-Bremer & Co., Chicago, Ill., a corporation of Illinois Application October 29, 1941, Serial No. 416,952

4 Claims. (Cl. 10—86)

The invention relates to the manufacture of self-locking nuts.

One object of the invention is to provide an improved method for making self-locking nuts which are formed of plate metal and comprise a base, a rigid sleeve provided on its inner periphery with an uninterrupted screw-thread and resilient tongues which are provided with teeth for locking the nut, the screw-thread on the sleeve and the teeth on the tongues being adapted to interfit with and engage a screw-thread on a screw or other element.

In fabricating nuts of this character, it is desirable to have the teeth on the tongues and the thread on the sleeve conform to the thread on the screw on which the nut is to be used, so that the nut in its entirety can be normally turned freely on to the screw. In carrying out the invention a blank is first shaped to provide a base, the sleeve on the base and resilient tongues attached to the base. The partially formed nut is then placed in a jig or chuck and the thread is cut by a screw-forming tap in the inner periphery of the sleeve and the teeth on the tongues are cut co-axially with the sleeve so they will conform to the side faces of the thread on the screw on which the nut is to be used.

Other objects of the invention will appear from the detailed description.

The invention consists in the several novel features which are hereinafter set forth and are more particularly defined by claims at the conclusion hereof.

In the drawing, Fig. 1 is a plan of the blank formed of plate metal which has been cut for forming the base of the nut, the side-flanges and the locking tongues, and after the central portion of the base has been flanged to form an upstanding sleeve. Fig. 2 is a plan illustrating the blank after the tongues have been bent to extend radially inward so their inner ends will lap the sleeve, preparatory to cutting the screw-thread in the sleeve and the teeth in the inner ends of the tongues. Fig. 3 is a plan illustrating the partially formed nut in a jig or chuck in which it is confined during the cutting of the screw-thread in the sleeve and the teeth in the tongues, a portion of the blank being shown in section. Fig. 4 is a section taken on line 4—4 of Fig. 3 after the screw-thread has been cut in the sleeve and the teeth have been cut in the tongues. Fig. 5 is a perspective of the finished nut. Fig. 6 is a section of the nut applied to a screw.

The invention is exemplified for making a self-locking nut formed of a blank of flat metal of sufficiently heavy stock to function as a nut which comprises a hexagonal base 8 which extends transversely of the axis of the screw-thread on which the nut is to be used, such as a screw or bolt a, or other element having a screw-thread. The base 8 is adapted to abut against the work c. The central portion of the base has an integral and rigid upstanding cylindrical sleeve 9 which is provided with a screw-thread 9ª of several complete convolutions on its inner periphery for interfitting with and engaging a sufficient area between the nut and the bolt to withstand heavy loads. The base 8 may be hexagonal and has upturned flanges 11 which extend substantially at right angles to the plane of the base and are formed by bending portions of the blank upwardly from the outer edge of the base. Each flange is provided at one of its ends with a vertically extending resilient tongue 12 formed by bending a strip of the stock radially inward from one end of the flange. Each tongue 12 and flange 11 is a greater height than sleeve 9. The inner end of each tongue is provided with a plurality of V-shaped teeth 13 which extend longitudinally of the screw and are shaped to conform to the cross-sectional shape of the groove in thread b on the screw a. The teeth on the tongues are helically arranged conformably with the spiral of the thread of the screw to fit between and engage the side faces of the successive convolutions of the thread. The lower edges 12ª of tongues 12 extend obliquely upward and inwardly from the base 8 to a point on the upper end of sleeve 9. The tongues are laterally resilient and extend inward at such an angle that their inner ends will slide on the faces of the screw while the nut is being turned onto the screw, and will bite into said faces when the nut is urged rotatably in the opposite direction after the nut has engaged the work. The portion 8ª which joins the sleeve 9 and base 8 is slightly curved so that the outer portion of the base will be engaged by the work.

In fabricating the nut a blank of plate metal is cut to the contour illustrated in Fig. 1 for forming the base 8, flanges 11, and tongues 12. The central portion of the base-forming portion of the blank is drawn or flanged to form an upstanding or completely cylindrical upstanding rigid sleeve 9. The portions of the blank for the tongues 12 are then bent at right angles to the plane of the base 8 and flanges 11. The flanges are then bent to extend at right angles to the plane of the base to form the sides of the nut and so the tongues 12 will extend radially inward from the ends of the flanges 11 to which they are attached. This will bring the inner ends of the tongues into substantial alignment with the inner periphery of, and so they will lap, the sleeve 9. Next the partially formed nut is placed in a jig c which is provided with a socket c¹ in which the sides of flanges 11 will fit. The blank will then be confined in the jig against rotation. The jig is provided with upstanding members c² and c³ between which the tongues fit and which extend to points near the inner ends of the tongues 12. A suitable screw-cutting tap is then rotatably operated to cut a continuous screw-thread in the inner periphery of the sleeve 9, and to cut teeth in the inner ends of the tongues which conform to the screw-thread b on the element a, and to the thread 9ª in the sleeve 9. Members c² and c³ function to secure the resilient tongues 12 against circumferential bending during the rotation of the tap d. The single tap will consecutively cut the thread in the sleeve and the teeth in the tongues. These cuts will be co-axial so that the screw-thread in sleeve 9 and teeth 13 in tongues 12 will conform accurately to the successive convolutions of the screw-thread b on element a. This makes possible a corresponding fit between the teeth 13 and thread 9ª and the thread b so that the nut can be turned freely around the screw-thread on which the nut is used until the nut engages the work. When the latter occurs, the marginal portion of the base 8 will be forced upwardly and inwardly to jam the teeth 13 into the side faces of the screw-thread and thereby lock the nut on the element a. When the nut is to be removed a special wrench is used which will flex the tongues 12 circumferentially in one direction to disengage the teeth 13 from the screw-thread on the element a.

The invention exemplifies the method of making lock-nuts from a blank of plate metal in which the screw-thread in the sleeve on the base and the teeth on the resilient locking tongues are cut co-axially and consecutively by a single tap so they will conform to the screw-thread b on the element a with the desired fit. The inner faces of the teeth will be curved transversely to conform to the screw-thread in the sleeve and conformably to the spiral of the screw-thread on which the nut is used.

The invention is not to be understood as restricted to the details set forth, since these may be modified within the scope of the appended claims without departing from the spirit and scope of the invention.

What I regard as new and desire to claim by Letters Patent is:

1. That improvement in making self-locking nuts from plate metal which comprises shaping a portion of the blank into a base with an upstanding integral cylindrical sleeve in the central portion thereof, trimming the blank to provide portions for forming tongues, bending said portions to form transversely resilient tongues extending radially and inwardly from the margin of the base, with upstanding side-faces and upstanding edges at their inner ends overlapping the sleeve, and tapping the sleeve and the tongues to cut an internal screw-thread in the sleeve and a succession of helically arranged teeth transversely across the inner ends of the tongues in phase with the teeth in the sleeve.

2. That improvement in making self-locking nuts from plate metal which comprises shaping a portion of the blank into a base with an upstanding integral cylindrical sleeve in the central portion thereof, trimming the blank to provide portions for forming tongues, bending said portions to form transversely resilient tongues extending radially and inwardly from the margin of the base, with upstanding side-faces and upstanding edges at their inner ends overlapping the sleeve, tapping the sleeve and the tongues in axial progression to cut an internal screw-thread in the sleeve and a succession of helically arranged teeth transversely across the inner ends of the tongues in phase with the thread in the sleeve, and supporting the resilient tongues against transverse bending during the cutting of the teeth.

3. That improvement in making self-locking nuts from plate metal which comprises shaping a portion of the blank into a base with an upstanding integral cylindrical sleeve in the central portion thereof, trimming the blank for providing portions for forming flanges and tongues, bending said portions to form upstanding sides around the margin of the base and tongues extending radially and inwardly from the side flanges, with upstanding side-faces and longitudinally extending edges at their inner ends overlapping the sleeve, and tapping the sleeve to cut an internal screw-thread therein and the inner ends of the tongues to cut a succession of helically arranged teeth transversely across the inner edges of the tongues in phase with the teeth in the sleeve.

4. That improvement in making self-locking nuts from plate metal which comprises shaping a portion of the blank into a base with an upstanding integral cylindrical sleeve in the central portion thereof, trimming the blank for providing portions for forming flanges and tongues, bending said portions to form upstanding sides around the margin of the base and tongues extending radially and inwardly from the side flanges, with upstanding side-faces and longitudinally extending edges at their inner ends, tapping the sleeve to cut an internal screw-thread therein and the inner ends of the tongues to cut a succession of helically arranged teeth transversely across the inner edges of the tongues in phase with the teeth in the sleeve, and supporting the tongues against transverse bending during the cutting of the teeth.

ARTHUR H. THOMPSON.